J. W. GORDON.
PUMPING DEVICE.
APPLICATION FILED AUG. 6, 1920.
1,386,330.
Patented Aug. 2, 1921.
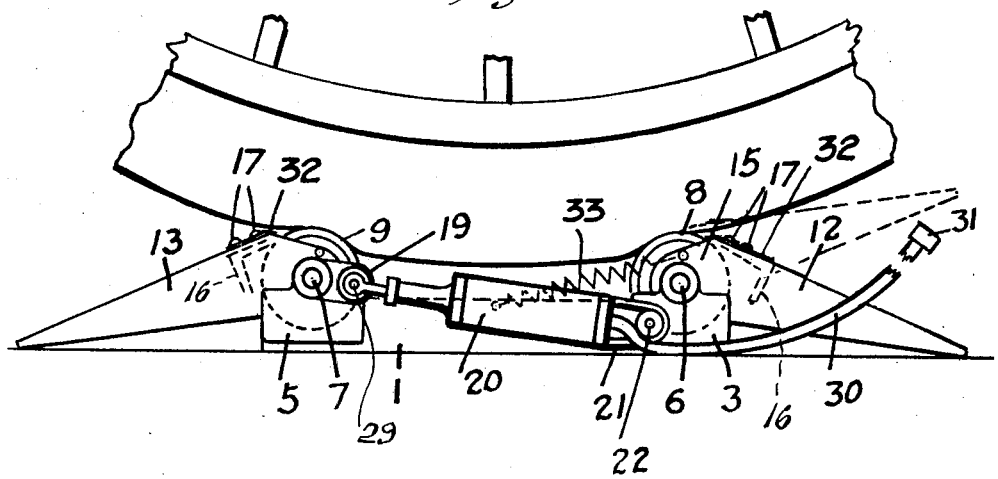
Fig. 1.
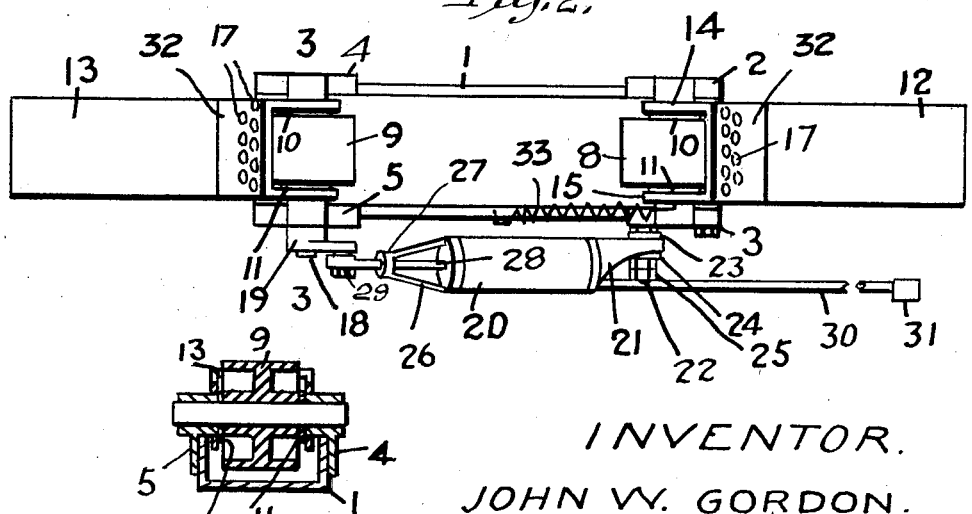
Fig. 2.
Fig. 3.
INVENTOR.
JOHN W. GORDON.
BY

UNITED STATES PATENT OFFICE.

JOHN WARWICK GORDON, OF ST. CATHARINES, ONTARIO, CANADA.

PUMPING DEVICE.

1,386,330.   Specification of Letters Patent.   Patented Aug. 2, 1921.

Application filed August 6, 1920. Serial No. 401,655.

*To all whom it may concern:*

Be it known that I, JOHN WARWICK GORDON, a subject of the King of Great Britain, and a resident of the city of St. Catharines, in the county of Lincoln, in the Province of Ontario, Canada, have invented certain new and useful Improvements in Pumping Devices, of which the following is the specification.

My invention relates to improvements in pumping devices for automobiles and the object of the invention is to devise simple portable means whereby a deflated tire may be readily supplied with air at any point in the route and when not in proximity to an air supply station. A further object is to construct a device for supplying a means whereby garages and stores handling automobile accessories in districts having no available electric or other power can supply free air to customers and it consists of the following arrangement and construction of parts as hereinafter more particularly explained.

Figure 1 is a side elevation of my device showing a portion of one of the drive wheels of the automobile in engagement therewith.

Fig. 2 is a plan view of my device.

Fig. 3 is a sectional view on line 3—3 Fig. 2.

In the drawings like characters of reference indicate the corresponding parts in each figure.

1 indicates a short piece of channel bar forming a shoe to one end of which are secured bearing brackets 2 and 3 and at the opposite end bearing brackets 4 and 5. 6 and 7 indicate short shafts journaled in the brackets and upon which are mounted rollers 8 and 9 separated from the inner ends of the bearing brackets by interposed washers 10 and 11. 12 and 13 indicate tread plates which are inverted U-shaped in cross section, the side flanges of which are provided with downwardly extending bearing portions 14 and 15 which are freely swung upon the shafts 6 and 7. The inner ends of such plates are provided with reinforcing angle bars 16 through which and the top of the tread plates extending rivets 17 form a traction surface. When in use the tread plates extend outward from the ends of the channel bar 1 and rest at their free ends upon the ground. The shaft 7 is extended as indicated at 18 and has mounted thereon a crank arm 19. 20 indicates a pump provided at one end with a bracket 21 swung upon the stud pin 23 which is an extension of one of the securing bolts connecting the brackets 3 to the channel bar 1. The stud pin is provided with washers 23 and 24 located at each side of the bracket 21, and 25 indicates securing nuts by which the bracket 21 is secured upon the stud pin. The opposite end of the pump cylinder is provided with a bearing bracket 26 having a bearing portion 27 through which the pump rod 28 extends. The outer end of the pump bar is connected at 29 to the crank arm 19. 30 is a rubber tube extending from the pump cylinder provided with a head 31 adapted to connect with the valve of the automobile tire.

When it is desired to pump up a deflated tire, my device is placed in the position shown in the drawing in front of one of the drive wheels which is not deflated and the car moved forward so that such drive wheel passes up the inclined tread plate 12 onto the rollers 8 and 9 and into the position indicated by full lines in Fig. 1. In this position the wheel spins revolving rollers 8 and 9 and turning the shaft 7 which is rigidly secured to the roller 9. The crank arm 19 is thereby turned operating the pump rod 28, the pump cylinder swinging upon the stud cylinder 22. The end 31 of the tube 30 of course is connected to the valve of the deflated tire. 32 is a strip of fabric fastened by rivets 17 to the top side of the upper end of the tread plates 12 and 13 and for the purpose when required of instantaneously engaging between the rollers 8 and 9 and the auto wheel when running the car off the rollers. It also prevents the tire from injury from contact with the ends of tread plates 12 and 13. When the tire has been inflated to the required extent the tread plate 12 or 13 is thrown upward by connecting the spring 33 so that the traction surface formed by the fabric 32 and the heads of the rivets 17 is forced into engagement with the revolving tire which thereby draws the car forwardly or rearwardly off the rollers 8 and 9, the tread plate 12 or 13 immediately assuming its normal position on releasing the spring 33. The device can be used on either side of any make of car. When my device is not in use the tread plates 13 and 14 may be folded inwardly between the rollers 8 and 9 into an overlapping position, thereby rendering the device compact for transportation.

From this description it will be seen that I have devised a very simple means whereby a deflated tire may be readily and quickly pumped up by the driver of the car at any place desired and therefore is particularly useful in country places where there are no air supply stations and where it would therefore necessitate pumping up the tire by hand which is a slow and laborious operation.

What I claim as my invention is:—

A pumping device for automobiles comprising a supporting base, a pair of shafts journaled therein, a roller journaled upon each shaft, said rollers spaced apart together to form a support for an automobile wheel, a crank arm secured to one of the shafts, a pump pivoted at one end of the supporting base and having its pump rod pivotally connected to the crank arm, an inclined tread plate swung upon the other shaft and adapted to rest upon the ground at one end and to overlie the outer peripheral portion of the adjacent roller whereby the tire revolving in a forward direction runs free of the inner end of the tread plate and frictionally engages such inner end when reversed whereby the tread plate is carried upward as the direction of the rotation of the tire is reversed and into engagement with the tire to form a traction grip to carry the automobile wheel off the supporting rollers.

JOHN WARWICK GORDON.